L. C. BADEAU.
STEERING APPARATUS FOR AIRSHIPS.
APPLICATION FILED JAN. 3, 1910.

1,156,514.

Patented Oct. 12, 1915.

3 SHEETS—SHEET 1.

Witnesses:
Isaac Francis Badeau
Emily A. Davis

Inventor:
Louis C. Badeau,
By his Attorney,

L. C. BADEAU.
STEERING APPARATUS FOR AIRSHIPS.
APPLICATION FILED JAN. 3, 1910.
1,156,514.
Patented Oct. 12, 1915.
3 SHEETS—SHEET 2.
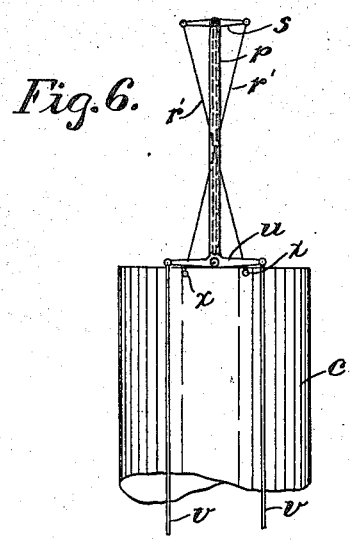
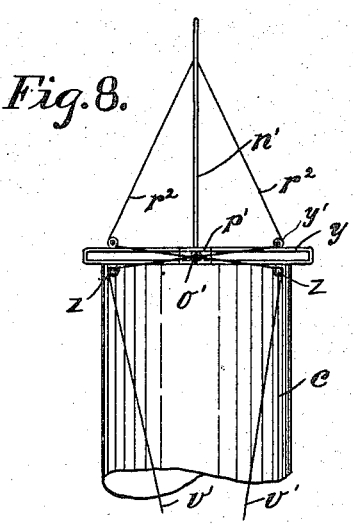
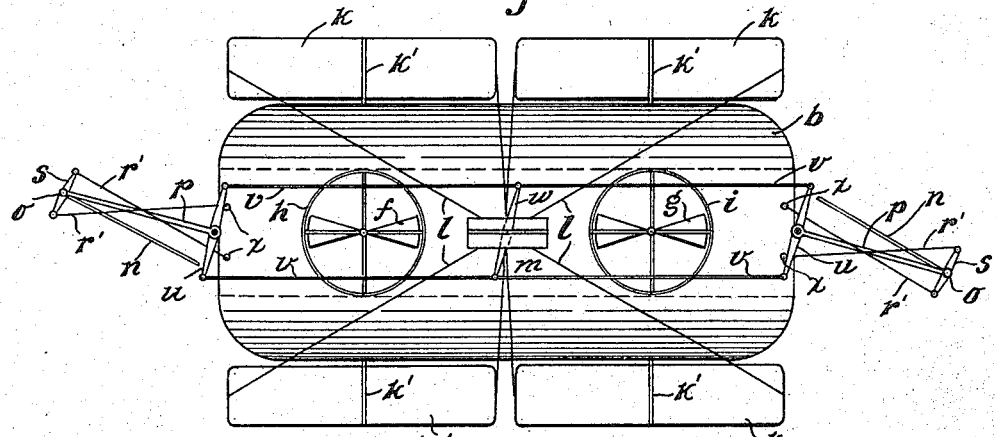
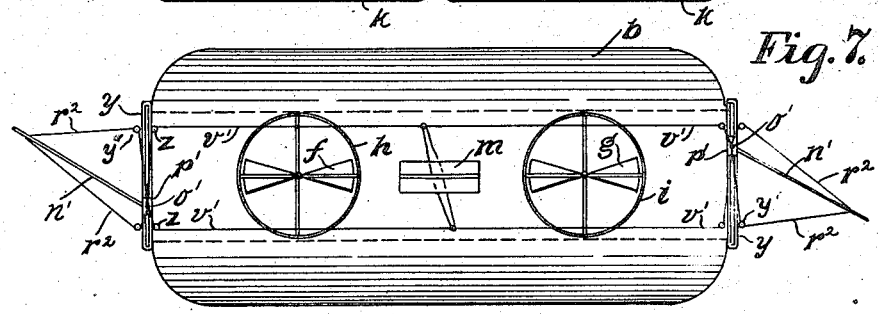
Witnesses:
Inventor:
Louis C. Badeau,
By his Attorney,

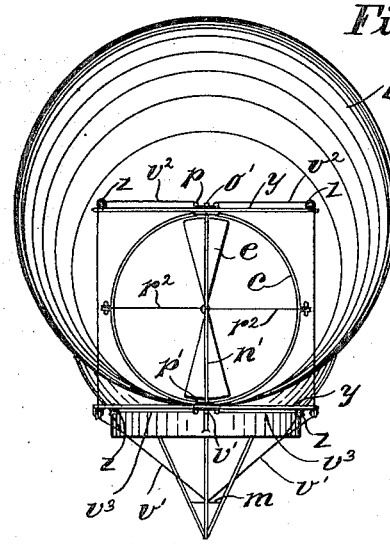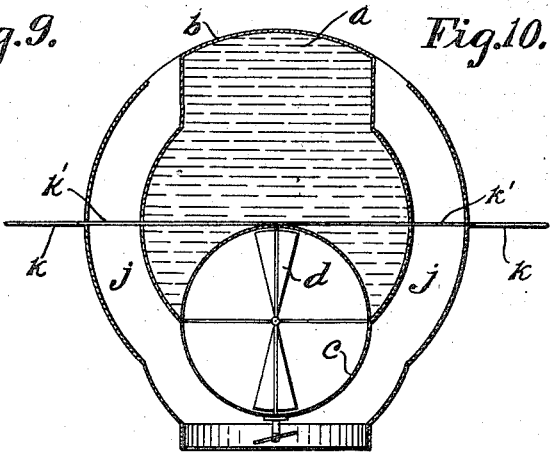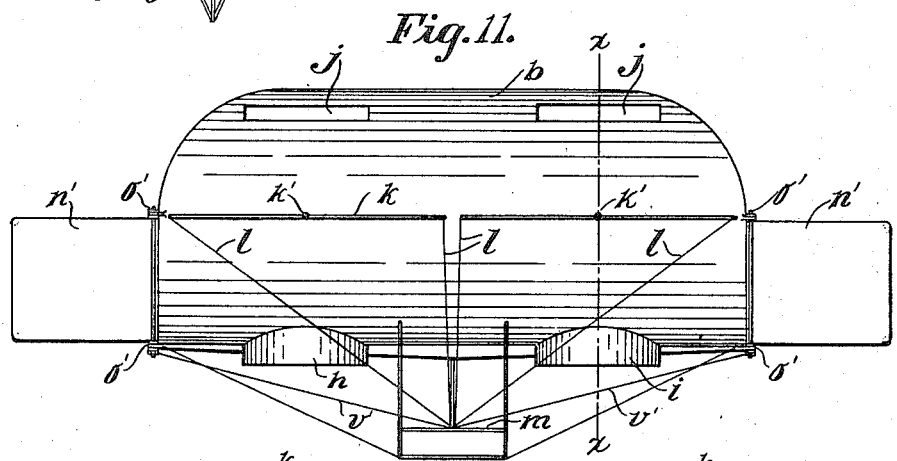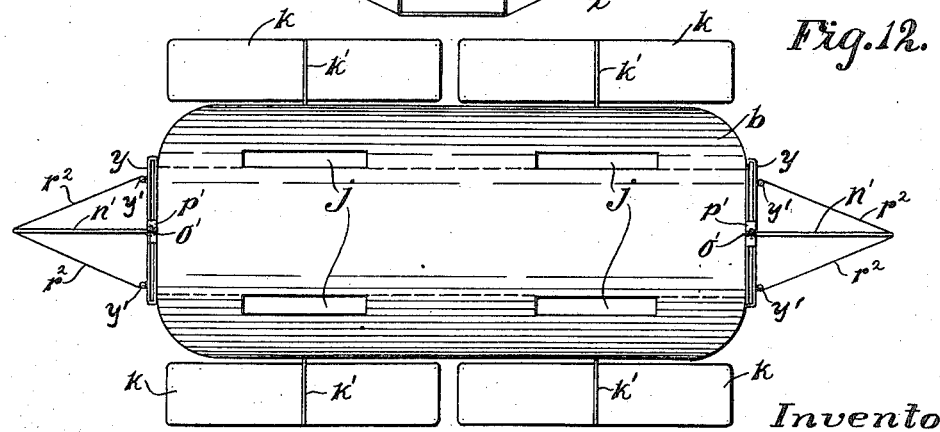

A # UNITED STATES PATENT OFFICE.

LOUIS C. BADEAU, OF NEW YORK, N. Y.

STEERING APPARATUS FOR AIRSHIPS.

1,156,514.

Specification of Letters Patent.   Patented Oct. 12, 1915.

Application filed January 3, 1910.  Serial No. 536,024.

*To all whom it may concern:*

Be it known that I, LOUIS C. BADEAU, a citizen of the United States, and resident of Greater New York, State of New York, have invented certain new and useful Improvements in Steering Apparatus for Airships, of which the following is a full, clear, and exact description, such as will enable those skilled in the art to which it appertains to make and use the same.

This invention relates to steering apparatus for air-ships; and, while in the accompanying drawings the improvements are shown applied to an air-ship of the so-called "dirigible balloon" type, they may be applied as well to many other forms and types of machine for aerial navigation. The object of the invention is to provide improved steering means whereby practically perfect control of the horizontal movements of the aerial vessel may be attained. The improvements are designed particularly for airships having longitudinal propeller-tubes, and a further object of the invention is to cause the rudder to act upon practically the entirety of the column of air entering or leaving such propeller-tube, without at any time closing part or all of the open end of the tube.

The invention consists in the parts, arrangements and combinations, illustrated in different embodiments in the accompanying drawings, described in the following specification, and more particularly pointed out in the appended claims.

Figure 3:
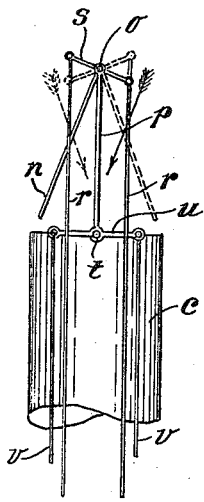
Figure 4:
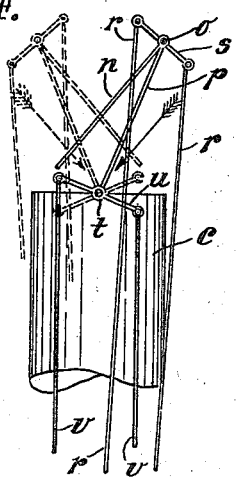
Figure 1:
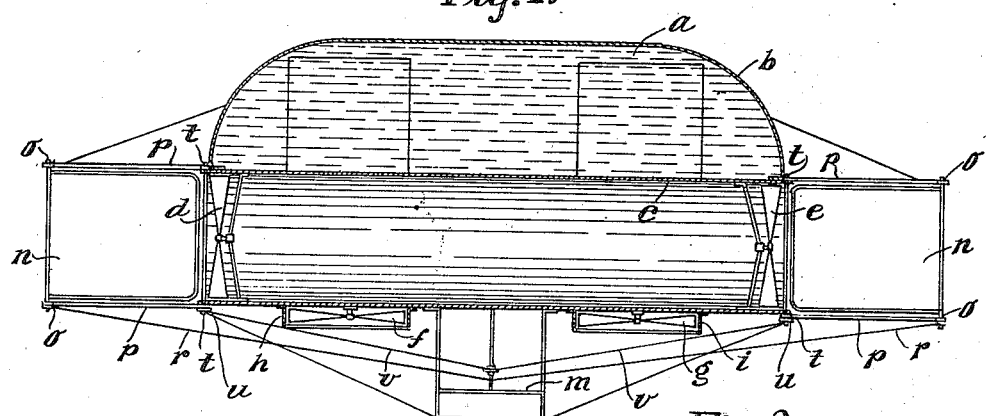
Figure 2:
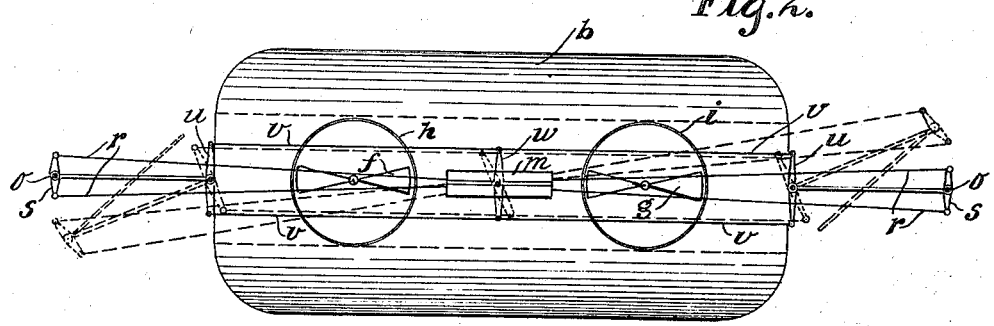

In the drawings, Figure 1 is a longitudinal section through an air-ship provided with one embodiment of the improved steering mechanism; Fig. 2 is a bottom plan view thereof, showing in dotted lines a shifted position of the steering mechanism; Figs. 3 and 4 are detailed bottom plan views of one end of the propeller-tube and the rudder and immediately connected parts, the steering parts being shown in full and in dotted lines in a variety of positions; Fig. 5 is a bottom plan view of an air-ship provided with a different form of the steering apparatus; Fig. 6 is a detail bottom plan view of one end of the propeller tube and rudder and connected parts constructed according to this embodiment of the invention; Fig. 7 is a bottom plan view of an air-ship provided with still another form of steering apparatus; Fig. 8 is a detail bottom plan view of one end of the propeller tube and the rudder and connected parts in this form of the invention; Fig. 9 is an end view of the air-ship and steering apparatus shown in plan in Fig. 7; Fig. 10 is a cross-section on the line *x—x* of Fig. 11, the air-ship in this instance being shown as provided with lateral planes; Fig. 11 is a side elevation of this form of air-ship; and Fig. 12 is a plan view thereof.

Reference will first be had to Figs. 1 to 4 of the drawings, though the description now given of the body of the air-ship will apply as well to the remaining views. The letter *c* indicates a longitudinal propeller-tube, which, as is my co-pending application, filed January 28, 1908, Serial No. 413,103, may be associated with an inclosed space *a* to be filled with a suitable gas of less specific gravity than air. This gas space is shown as formed between the propeller-tube *c* and an outer tube or container *b*. Preferably, the propeller-tube *c* is placed eccentrically within the outer tube *b*, the ends of which latter are drawn over and onto the ends of the smaller tube and connected thereto to form a gas-tight joint. The smaller tube is preferably thus fastened to the larger tube with the lowest points of their walls in close proximity, and with their center lines in parallelism, for the purpose of giving rigidity to and lowering the center of gravity of the balloon, thus counteracting in great degree any tendency toward rolling or rocking in a transverse sense.

The inflatable body or balloon may be constructed of textile fabric, like silk or canvas, or any other suitable material, and may be properly braced and reinforced to withstand external as well as internal pressure.

The propeller-tube *c* is open at both ends and forms an air-shaft or tunnel, in which one or more vertical propellers *d*, *e*, preferably one immediately within each end of the tube, are mounted for moving the airship forward or backward.

In addition, if desired, there may be provided horizontal propellers *f*, *g*, mounted, respectively, in short vertical tubes *h*, *i*, which are open at their lower ends below the balloon body and communicate with flues, as *j*, leading to and through the top of the tube *b*, without in any way interfering with the propeller-tube *c*. (See Figs. 10—12).

If desired, as indicated in Figs. 5, 10, 11 and 12, a number of horizontal planes, as *k*, may be arranged at the sides of the balloon, all preferably in the same plane and mounted on horizontal spindles, as $k'$, in such manner that these planes may be placed at any angle to the axis of the balloon, from a horizontal to a vertical position, as by means of cords or ropes $l$, secured to these rudders or planes in suitable places and conducted downward to the car or platform $m$, within reach of the pilot.

It will be understood that the invention is by no means limited to the dirigible balloon type of air-ship. As in my co-pending application, the propellers $d$, $e$ and $f$, $g$ may be driven by suitable motors and through suitable transmission, which it is not thought necessary to illustrate here.

Referring now more particularly to the form of steering apparatus shown in Figs. 1 to 4, the letter $n$ indicates a vertical rudder disposed centrally opposite the open end of the propeller-tube $c$. Preferably, there are two rudders, one at each end of the propeller-tube, as in this way complete control is secured. Each rudder $n$ is pivoted at its outer end as at $o$ to the outer end of a bracket $p$, secured to the end of the air-ship and projecting forward, or rearward, therefrom. The rudders are turned on their brackets by suitable means, as by cords or cables $r$, secured to cross-arms $s$ on the rudders and extending to the car $m$, where they may be operated in any suitable manner.

Pivoting the rudders at their outer ends insures effective operation, but in order to enhance the results the supports or brackets $p$, and hence the pivots $o$, of the rudders may be shifted laterally. For this purpose the brackets $p$ are pivotally supported, as at $t$, at their inner ends, and are provided with cross-arms $u$ and operating ropes $v$. These operating ropes $v$ may be connected to an operating lever $w$, whereby parallel movement of the brackets is effected; or the brackets, and also the rudders, may be moved independently.

In Figs. 5 and 6, the arrangements differ in that the two cables or braces $r'$ connected to each rudder are secured at their inner ends to the frame of the air-ship, as indicated at $x$, whereby swinging of the brackets $p$ automatically turns the rudders. In order to turn the rudders in the proper direction, the cables or braces $r'$ are crossed, as shown.

In Figs. 7 to 12, the rudders $n'$ are pivoted at their inner ends, as at $o'$, to laterally movable supports $p'$, which are shown as mounted and guided in slotted guides $y$. The operating ropes $v'$, for moving the supports $p'$ laterally, are secured at their outer ends to these supports, and may pass around pulleys $z$. As shown, the cords $v'$ may branch into upper cords $v^2$ and lower cords $v^3$, connected, respectively, to the upper and lower ends of the supports $p'$. The cords $r^2$ are secured at their outer ends to the outer ends of the rudders and at their inner ends to the supports $p'$ and intermediately pass about pulleys $y'$. Hence, lateral shifting of the supports $p'$ through the action of the cords $r^2$, turns the rudders.

What I claim as new is:

1. A machine for aerial navigation having a longitudinal propeller-tube open at its ends, propelling means therein, a vertical rudder at one end of the propeller-tube, a vertical pivot supporting said rudder, and means for materially displacing said pivot in a direction sidewise of the pivot and of the machine and for swinging the rudder in the opposite direction about the axis of the pivot so as to dispose the rudder diagonally across the end of the tube.

2. A machine for aerial navigation having a longitudinal propeller-tube open at its ends, propelling means therein, two vertical rudders located, respectively, at the two open ends of said propeller-tube, vertical laterally movable pivots supporting said rudders, and means for materially displacing said pivots in a direction sidewise of the pivots and of the machine and for swinging the rudders in the opposite direction about the axes of the pivots so as to dispose the rudders diagonally across the ends of the tube.

3. A machine for aerial navigation having a longitudinal propeller-tube open at its ends, two vertical rudders located, respectively, at the two open ends of said propeller-tube, said rudders being both mounted on laterally movable pivots, and common operating means associated with both rudders whereby said pivots are moved laterally simultaneously and in opposite directions and said rudders are turned in unison and substantially in parallelism.

4. A machine for aerial navigation comprising an elongated buoyant container, a longitudinal propeller tube therein open at its ends, propelling means therein, a vertical rudder located at one of the open ends of the propeller-tube, a vertical pivot supporting said rudder adjacent one of the ends thereof, and controlling means for materially displacing said pivot in a direction sidewise of the pivot and of the machine and for swinging said rudder about the axis of the pivot so as to dispose the rudder diagonally across the end of the tube.

5. A machine for aerial navigation having a longitudinal propeller-tube open at its ends, a bracket extending forward from an open end of said propeller-tube, being pivoted to the frame of the machine at its inner end, and a vertical rudder pivoted at its outer end to the outer end of said bracket.

6. A machine for aerial navigation having a longitudinal propeller-tube open at its ends, propelling means therein, a bracket extending forward from an open end of said propeller-tube, being pivoted adjacent its inner end to the frame of the machine, a vertical rudder pivoted at its outer portion to the outer portion of said bracket, and controlling means for turning said bracket and turning said rudder on said bracket.

7. In a machine for aerial navigation, a bracket projecting longitudinally therefrom and pivotally supported thereby, and a vertical rudder pivoted adjacent its outer end on a vertical axis to the outer part of said bracket.

8. In a machine for aerial navigation, a bracket projecting longitudinally therefrom and pivotally supported on a vertical axis, and a vertical rudder pivoted adjacent its outer end on a vertical axis to said bracket.

LOUIS C. BADEAU.

Witnesses:
J. F. BRANDENBURG,
WM. T. FISHBOUGH.